S. U. WALCK.
BRAKE BEAM.
APPLICATION FILED DEC. 31, 1909.
955,620.
Patented Apr. 19, 1910.
2 SHEETS—SHEET 1.
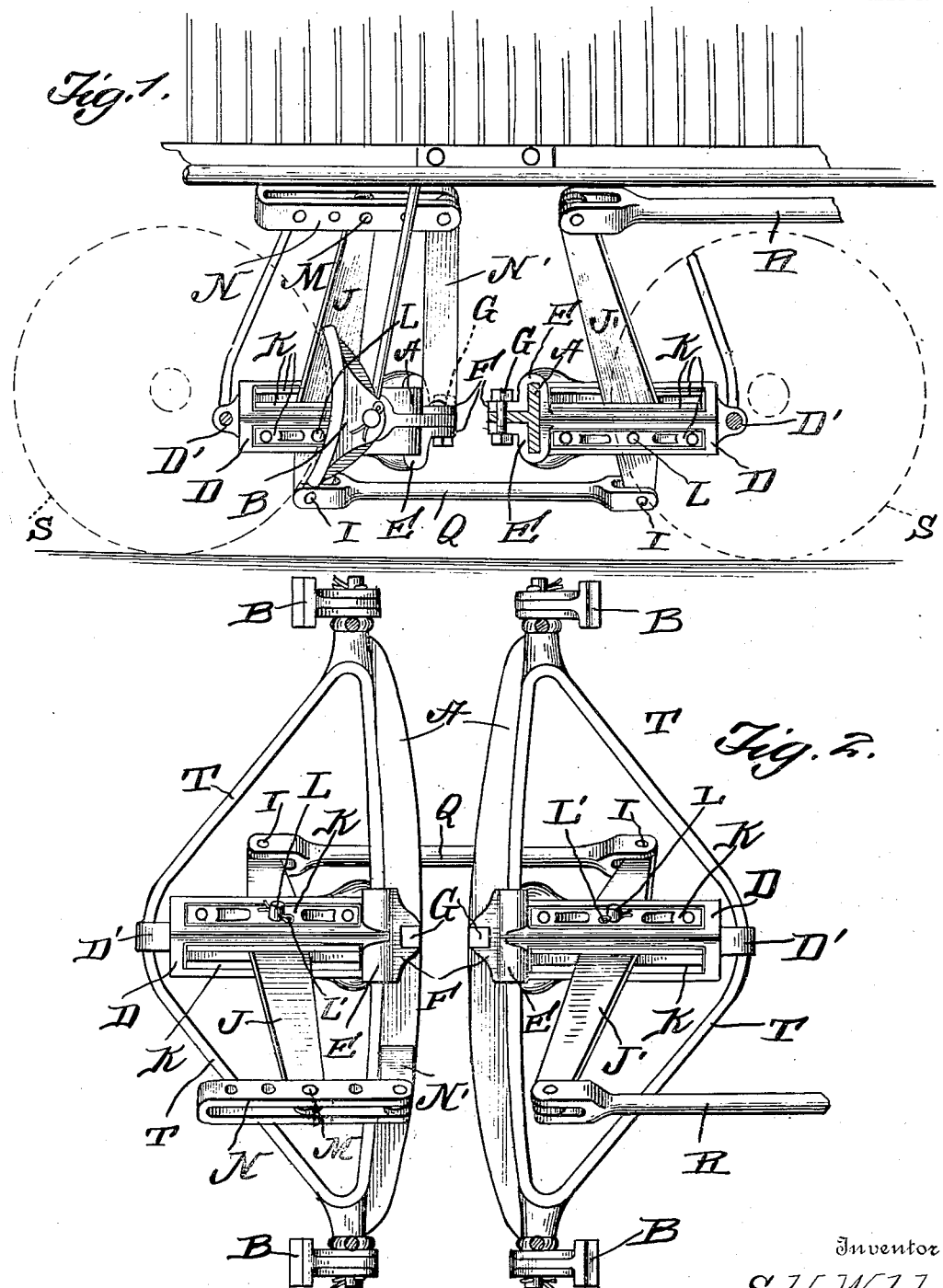

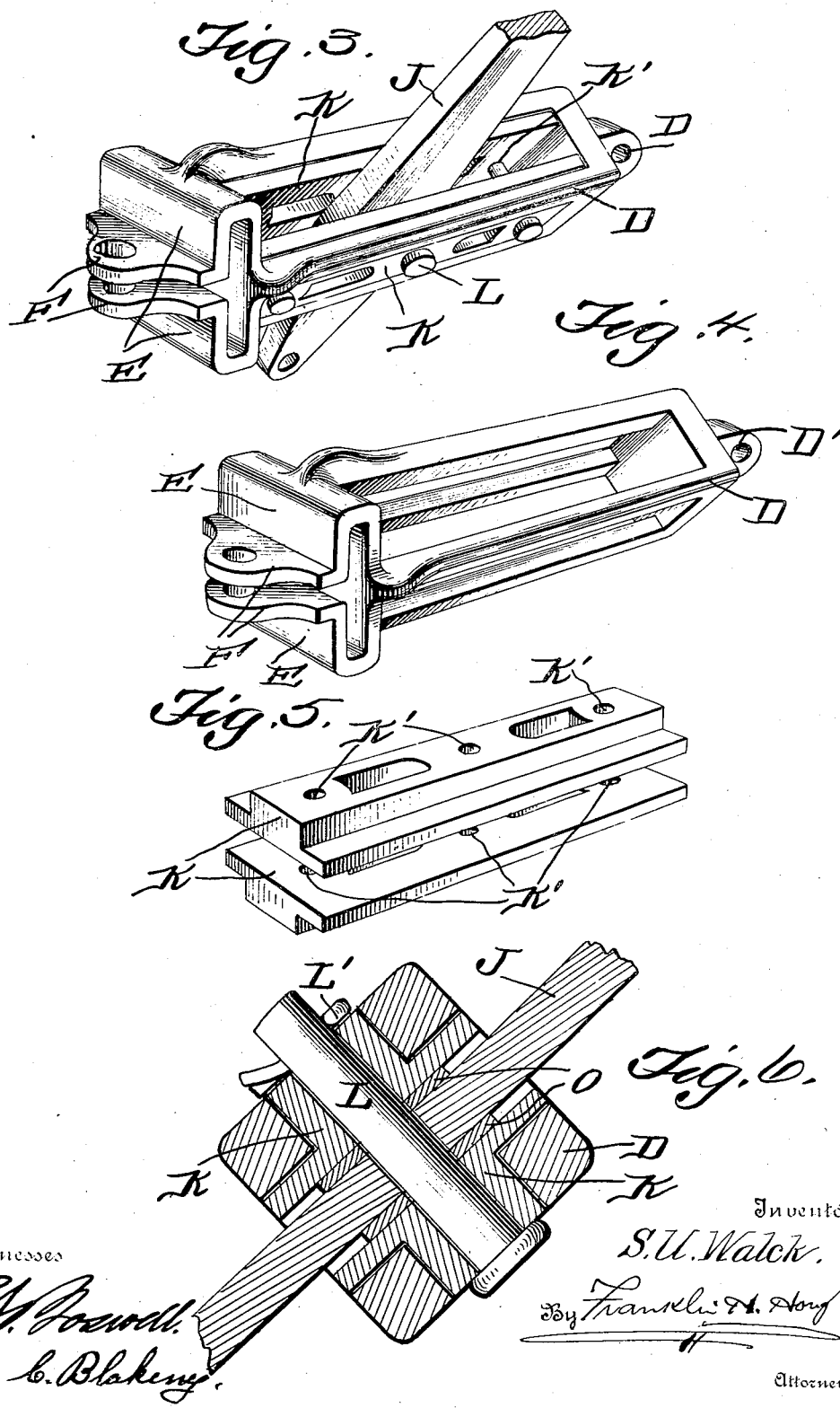

UNITED STATES PATENT OFFICE.

SYLVESTER U. WALCK, OF LEHIGHTON, PENNSYLVANIA.

BRAKE-BEAM.

955,620.

Specification of Letters Patent. Patented Apr. 19, 1910.

Application filed December 31, 1909. Serial No. 535,834.

*To all whom it may concern:*

Be it known that I, SYLVESTER U. WALCK, a citizen of the United States, residing at Lehighton, in the county of Carbon and State of Pennsylvania, have invented certain new and useful Improvements in Brake-Beams; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to new and useful improvements in brake beam struts adapted when applied to convert the beam from a right to a left or vice versa. At the present time, it is necessary to provide right and left beam struts to fit right and left beams, this being made necessary by reason of the brake levers being disposed at a particular angle. By the provision of the present invention, my device may be applied either to a right or left beam by simply changing plates held in the open sides of the strut, thereby allowing a railroad company to reduce appreciably its stock and still be able to readily attend to all repair work.
The invention comprises various details of construction, combinations and arrangements of parts which will be hereinafter fully described and then specifically defined in the appended claim.
I illustrate my invention in the accompanying drawings, in which:—

Figure 1 is a side elevation of a portion of the car showing the application of my invention to the brake beams. Fig. 2 is a top plan view. Fig. 3 is an enlarged view of the device removed from the brake beam. Fig. 4 is a perspective view with the lever and the sides for holding the same removed. Fig. 5 is a detail perspective view of the removable lever holding plates, and Fig. 6 is a sectional view through the frame, plates and pivotal lever.

Reference now being had to the details of the drawings by letter, A, A designate the usual beams of a brake for a car and B the brake shoes mounted thereon.

My improved brake beam struts, two of which are shown in the drawings, are designated each by letter D, details of which are shown in Figs. 3 to 5. Said struts are hollow and of general rectangular shape, terminating at one end in the two jaws E, E which have registering apertures in the outwardly extending portions F thereof and designed to clamp over the brake beam A in the manner shown in Figs. 1 and 2 of the drawings. Bolts G pass through registering apertures in the flange of the brake beam and said outwardly projecting portions of the jaws and serve to hold the latter in clamped relation, as shown clearly in Fig. 1 of the drawings.

Removably mounted opposite each other in the openings in said strut are the flanged plates K having apertures K' therein, the flanges of said plates being adapted to engage the inner marginal faces of the sides of the strut, while the outwardly projecting portions of the plates pass through the openings in the sides and have their outer faces flush with the outer faces of the sides. Said plates are adapted to receive a pivotal pin L held by means of a key L' in place and washers O are mounted upon the pin and interposed between a lever J pivotally mounted upon the pin and the inner faces of said plates. The lever J has a pivotal pin I at one end and the two pins I, one upon each of the levers J, it being understood that the other of the brake bars is equipped with a similar lever J', are connected together by means of the pivotal rod Q, shown clearly in Figs. 1 and 2 of the drawings. A loop N is pivotally connected upon a lug N' projecting from the brake beam and one end of the lever J is pivotally connected at M thereto.

An operating rod R is pivotally connected to one end of the lever J whereby, as the same is moved in one direction, the brakes are adapted to be set, whereas, when they are moved in the opposite direction, the brake shoes will be moved away from the wheels S.

In the event of it being desired to change the struts to a right or left beam, it may be done by removing the pivotal pin L and the plates K and mounting the same in two of the openings in the opposite sides of the strut, after which the lever J may be pivotally connected to the plates in their adjusted positions.

In order to reinforce and hold the outer end of each strut D, a brace rod T upon the brake beam is passed through an eye D', upon the rear end of the strut, as shown clearly in Figs. 1 and 2 of the drawings.

From the foregoing, it will be noted that, by the provision of a device as shown and described, a strut is provided which may be attached to the oridnary type of brake beam and so arranged that the sides may be quickly adjusted in openings in opposite sides of the struts to adapt the same for the right or left beams.

What I claim to be new is:—

In combination with the ribbed beams of a car, struts, the adjacent ends of each of which engage one of said beams, said struts having open faces, plates seated in the opposite openings of the shank portion of each strut, a pivotal pin passing through registering apertures in said plates, levers pivotally mounted one upon each of said pins, links connecting corresponding ends of said levers, a rod pivotally connected to one lever, a U-shaped bar pivotally connected to one of said beams and provided with apertures in which the end of one of said levers is adapted to be adjustably pivotally connected, the outer ends of each of said struts having an integral eye, and a brace fastened to said beams and engaging said eye.

In testimony whereof I hereunto affix my signature in the presence of two witnesses.

SYLVESTER U. WALCK.

Witnesses:
 FRANK J. FALK,
 ANDREW E. RIFFERT.